Sept. 16, 1952 H. JANKOWSKI 2,611,025
SELECTIVE SIGNAL TRANSMISSION SYSTEM
Filed Aug. 1, 1951
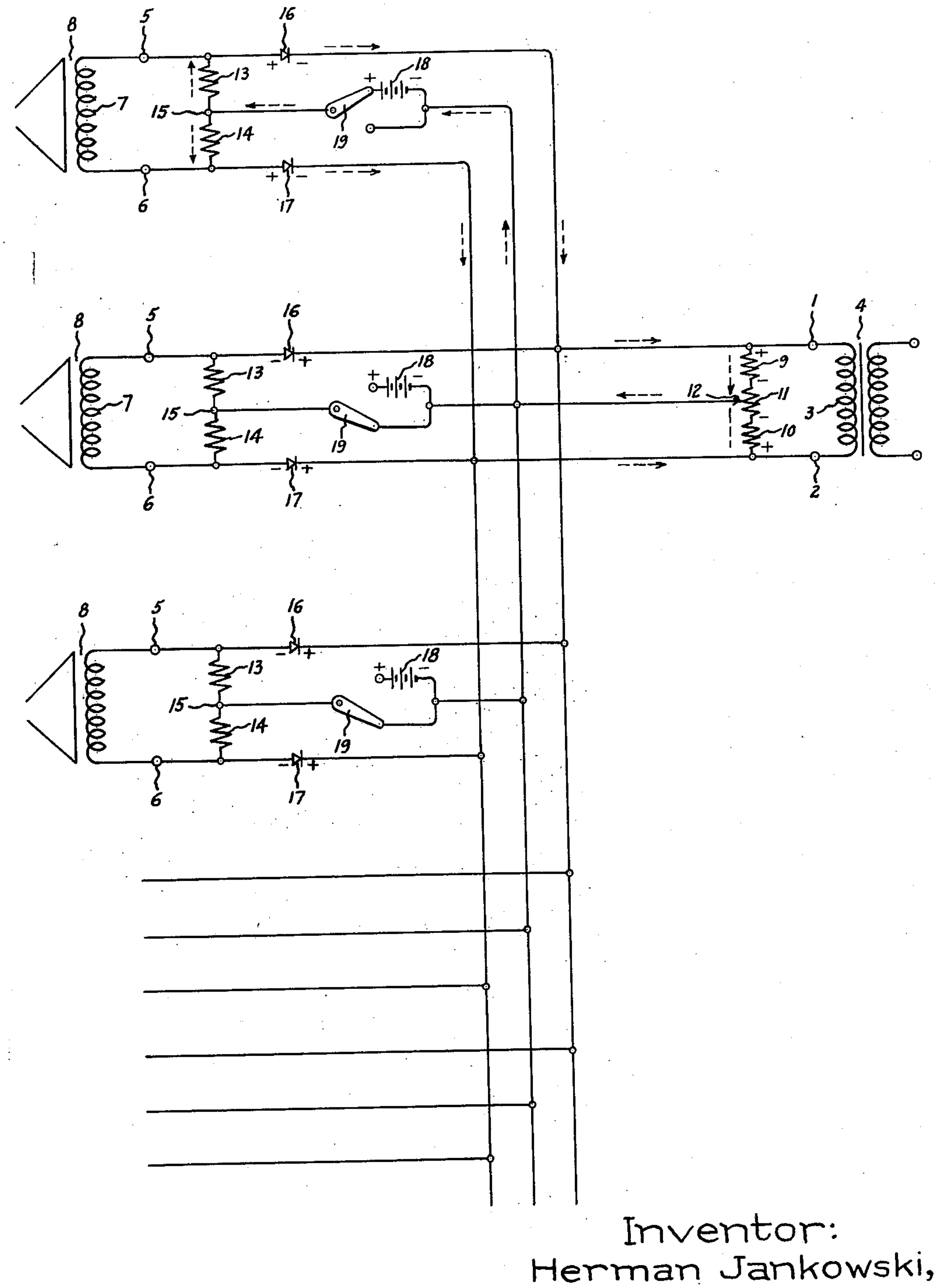
Inventor:
Herman Jankowski,
by Merton D Morse
His Attorney.

Patented Sept. 16, 1952

2,611,025

UNITED STATES PATENT OFFICE 2,611,025

SELECTIVE SIGNAL TRANSMISSION SYSTEM

Herman Jankowski, Liverpool, N. Y., assignor to General Electric Company, a corporation of New York Application August 1, 1951, Serial No. 239,823

6 Claims. (Cl. 177—353)

My invention relates in general to electrical transmission systems and in particular to transmission systems of the type for selectively transmitting electrical signals between any one of a plurality of pairs of terminals and a common pair of terminals.

An exemplary application in which the transmission system of my invention is particularly advantageous, and in conjunction with which the invention will be described without intent of limitation thereto, is found in the magnetic storage systems employed in computing apparatus of the digital type. In these magnetic storage systems, numbers and orders used in the computing apparatus are stored by recording plus signals on the magnetic surface of a revolving drum. As the drum revolves, a small section of its cylindrical surface passes continuously under the pole tips of each of a plurality of magnetic recording and reproducing heads. Since there are a large number of recording and reproducing heads arranged along the length of the drum, there is a problem in routing signals between any selected one of the heads and a common circuit in recording signals on or receiving playback signals from any selected recording track along the drum. Since pulse information to be recorded on or played back from all of the tracks originates from or is sent to a single circuit, such as an amplifier, in the computing apparatus, it is desirable that it be possible for any one head to be effectively connected individually for short times to that single circuit for signal transmission therebetween. Further, it is desirable that signal transmission between the signal circuit and the heads be switched from one head to another with great rapidity and with a minimum of switching transients in order to speed computing processes. And finally, because there are sometimes a great number of such heads (e. g. 100 or more) to selectively receive signals from or send signals to the common circuit, it is desirable that the components and circuits for carrying out the selective action be simple and economical in nature.

It is an object of my invention to provide a new and improved selective signal transmission system of the type described.

It is a further object of my invention to provide such a transmission system which is fast in selective action and which minimizes switching transients.

It is a still further object of my invention to provide such a transmission system that is made up of simple circuitry and economical components.

Briefly stated, my invention in one form thereof provides a selective transmission system for transmitting signals between a common first pair of terminals, such as the terminals of an amplifier, and any one of a plurality of second pairs of terminals, such as the terminals of a plurality of magnetic heads. A common tapped resistor, preferably center tapped by an adjustable connection, is connected in shunt relation with the first pair of terminals while a plurality of center tapped resistors are also each connected in shunt relation with one of the second pairs of terminals. A pair of similarly poled unidirectional impedances are connected between the extremities of each of the center tapped resistors and the common tapped resistor. When a direct voltage of predetermined polarity is applied between the center tap of the resistor in shunt with any selected second pair of terminals and the tap on the common resistor, a positive bias is applied to the corresponding pair of unidirectional impedances so that they present their low impedance characteristic to the transfer of signals between the selected second pair of terminals and the common first pair of terminals, i. e., the selected second pair of terminals is effectively connected to the first common pair of terminals for signal transmission therebetween. However, when the applied direct voltage is reversed in polarity, one of the pair of unidirectional impedances presents its high impedance characteristic to the transmission of signals and effectively disconnects the selected second pair of terminals from the common first pair. Thus, the switching of any one of the second pairs of terminals into or from effective connection with the common first terminals is accomplished electrically, all physical connections being previously made, by the application of a biasing voltage in one polarity or the other between the tap of the common resistor and the tap of the resistor in shunt with the one second pair of terminals. In a following part of the specification it will be made apparent how a positive bias voltage applied to allow signal transmission between one second pair of terminals and the common first pair of terminals may conveniently serve as the negative bias to prevent signal transmission between the remaining pairs of second terminals and the first pair of terminals, and other operational advantages will be pointed out.

The features of the present invention which I believe to be novel are pointed out with particularity in the appended claims. However, for a better understanding of the invention both as to its organization and operation, and for further objects and advantages thereof, reference should be had to the following description taken in conjunction with the accompanying drawing, in which the single figure is a schematic circuit diagram of a selective signal transmission system embodying my invention and illustrated in connection with magnetic recording and reproducing heads.

Referring now to the drawing, I have shown a common first pair of terminals 1 and 2, which may be a part of a common input or output circuit such as a first winding 3 of a transformer 4, and which are to be selectively switched into effective connection with one of a plurality of second pairs of terminals 5 and 6, which in turn may be parts of separate output or input circuits such as signal coils 7 of magnetic recording or reproducing heads 8. While I have shown but three of the second pairs of terminals 5 and 6 and three of the heads 8 for illustrative simplicity, it will be understood that any number of these, similarly connected, may be employed to receive signals from or send signals to the common pair of terminals 1 and 2 as indicated by the free ends of the conductors in the lower portion of the drawing. Connected in shunt relation with terminals 1 and 2 and thus in shunt relation with the common circuit illustrated as first winding 3, there is a tapped resistor effectively constituted by a potentiometer 11 connected serially between a pair of equal resistors 9 and 10, the series combination being connected in parallel across winding 3. By adjusting the movable tap 12 of potentiometer 11 to its midpoint, a preferred position, the equivalent of either two equal valued serially connected resistors or a center tapped resistor is formed. A plurality of center tapped resistors, effectively constituted by a plurality of pairs of equal valued resistors 13 and 14 having a common junction or center tap 15, are each connected in shunt relation with one of the pairs of terminals 5 and 6, i. e., each connected in shunt relation with one of signal coils 7. A pair of unidirectional impedances 16 and 17, preferably identical, is connected in series between each of the center tapped resistors 13—14 and the tapped resistors 9—11, each of impedances 16 thus connecting one of terminals 5, or one extremity of each center tapped resistor 13—14, with terminal 1, or one extremity of the tapped resistors 9—11; and each of impedances 17 thus connecting one of terminals 6, or the other extremity of each of center tapped resistors 13—14, with terminal 2 or the other extremity of tapped resistors 9—11. All of the unidirectional impedances 16 and 17 are similarly poled with respect to their corresponding terminals 5 and 6, i. e., oriented to present low impedance to conventional current flow in the same direction as shown in the drawing with respect to signal coils 7. Thus, unidirectional impedances 16 and 17 may all be oriented to present low impedance to conventional current flow into coils 7 and high impedance to conventional current flow out of coils 7; or as shown in the drawing, they may all be oriented to present low impedance to conventional current flow out of coils 7 and high impedance to conventional current flow into coils 7. The movable tap 12, or center tap formed thereby if movable tap 12 is located centrally, of the series resistance combination 9—11 and the junction or center tap 15 of each pair of resistors 13—14 are provided to receive a direct current biasing voltage therebetween, such a bias of one polarity or the other causing unidirectional impedances 16 and 17, to have either high or low impedance to signal transmission between a terminal pair 5 and 6 and the common terminal pair 1 and 2 and thus causing that pair of terminals 5 and 6 to be effectively disconnected or connected to the common terminals 1 and 2. Means for applying such biasing voltages may comprise fast acting, automatically controlled electronic circuits, or in the simplified illustrated form may comprise a voltage source illustrated as a battery 18 cooperating with a two-position switch 19. Positioning a switch 19 in contact with its battery 18 makes the junction or center tap 15 of the corresponding resistors 13 and 14 positive in polarity with respect to the tap or junction 12 of the common shunt-connected resistors 9—11. A second position for switches 19 is shown for connecting the two taps directly, i. e., placing zero voltage between them, for a purpose to be explained presently.

It will be understood that magnetic heads 8 may be used either for recording intelligence signals on or reproducing intelligence signals from a moving magnetic recording medium such as a revolving drum. In the recording process, therefore, heads 8 constitute a plurality of load devices or output circuits, any one of which is to be selected at will to receive input signals from a common signal source or input circuit such as transformer 4. Conversely, in the reproduction process, heads 8 constitute a plurality of separate signal sources or input circuits any one of which is to be selected at will to supply signals to a common load device or output circuit such as transformer 4. The selective transmission system of my invention, as will be seen, is, therefore, a bilateral system and is not limited to the transmission of signals in only one direction. It will also become apparent that the signal voltage may be of either polarity or the sense of signal current flow may be in either direction.

For an explanation of the operation of the present transmission system, consider that it is desired to transmit only signals reproduced in the signal coil 7 of the head 8 which is uppermost in the drawing to the primary winding 3 of transformer 4, remembering that all the while signal voltages are being simultaneously reproduced also in the signal coils 7 of the remaining heads 8 which are not to be transmitted to the common terminals 1 and 2. The uppermost switch 19 is positioned as shown in the drawing to be in contact with its battery 18, making the junction of the corresponding resistors 13 and 14 positive in potential with respect to tap 12 so that equal biasing currents flow, as shown by dashed arrows, through the unidirectional impedances 16 and 17, hence in opposite directions through resistors 13 and 14 and through resistors 9 and 10 producing voltage drops across the resistor pairs which cancel and cause little or no resultant voltage drop across the shunt-connected resistor combinations.

The purpose of potentiometer 11 is now apparent, that purpose being to allow for slight adjustments compensating for minor inequalities in the forward resistances of unidirectional impedances 16 and 17 and in the two halves of the center tapped resistors, which from a practical viewpoint are apt to exist. A similar potentiometer may be provided between resistors 13 and 14 if it is desired. The desired setting of movable tap 12, then, is that setting for which the total voltage drop across resistors 9, 10, and 11 due to the biasing currents is zero, even if the two biasing currents are not exactly equal because of slight inequalities in the forward resistances of impedances 16 and 17. In most cases, the setting may be considered as that of a center tap on the series resistance of resistors 9, 10, and 11 since the setting will not deviate appreciably therefrom.

The nature of the unidirectional impedances 16 and 17 is such that they have a relatively low forward resistance, i. e., the resistance when current is flowing through them in the direction of the symbolic arrows therefor, and a very high reverse resistance to current flow in the opposite direction. The impedances may be of any type—vacuum diodes, contact rectifiers, or crystal diodes—the latter having been found completely satisfactory. One readily obtainable type of crystal diode, for example, has a forward resistance of about 250 ohms but a reverse resistance of about 1 million ohms. The magnitude of the voltage of battery 19 is chosen such that the forward biasing current through each of the impedances 16 and 17 is at least as great as the maximum signal current to be transmitted between a pair of terminals 5 and 6 and terminals 1 and 2, this insuring that at all times during signal transmission both of impedances 16 and 17 are conducting current in a forward direction and have low resistance to the transfer of signals. Stated another way, transmitted signal current may be thought of as modulating the direct biasing current but never to such an extent that the total current tends to flow in a reverse direction through impedances 16 or 17. The magnitudes of the resistors, in turn, are chosen to be sufficiently high so that appreciable shunting of the signal current does not result. Thus if a voltage pulse, for example, is reproduced in signal coil 7 of the upper head 8, it is transmitted through the corresponding impedances 16 and 17, increasing the total current in one and decreasing the total current in the other, but not to the extent that current tends to flow in a reverse direction therethrough, to the transformer winding 3 with very little attenuation.

Consider next the remaining two lower heads 8 in the drawing which are to be effectively disconnected from winding 3 so that only signals from the upper head 8 are transmitted to winding 3. If a reverse voltage bias, i. e. a direct voltage tending to cause current in the high resistance direction, is placed on the lower pair of impedances 16 and 17, only a very small, negligible biasing current can flow and a large reverse voltage drop appears, in the polarity shown, across the lower pairs of impedances 16 and 17. The magnitude of the reverse biasing voltage is chosen to be at least as great as the maximum signal voltage to be reproduced in coils 7, so that under these conditions, both impedances 16 and 17 always have a reverse polarity voltage drop across them and present their high reverse resistances, thereby to cause great attenuation of the signal voltages induced in coil 7 and effectively prevent the transmission of such signal voltages to winding 3.

In accordance with an important aspect of my invention, the use of a separate reverse biasing voltage source is not necessary as shown in conjunction with the lower two heads 8 in the drawing. The lower two switches 19 are positioned to directly connect the center tap 15 of the lower resistance 13—14 to the tap 12 whereby the voltage drops appearing across the two halves of the resistance 9—11 as a result of the upper battery 18 are applied to the lower impedances 16 and 17 as reverse bias voltages. Due to the voltage dividing action of the upper resistors 13 and 14 and the common resistors 9, 10, and 11, this reverse bias on the lower impedances 16 and 17 is in magnitude some fraction of the total voltage of the upper battery 18. However, the voltage of battery 18 may be chosen so that the reverse bias on each of the lower impedances 16 and 17 is at least as great as the maximum signal voltage to be induced in the lower signal coil 7, so that the attenuating action effectively disconnecting the lower two coils 7 from winding 3 is obtained. Thus, the preferred form of my invention requires no separate reverse biasing sources although it will be understood by those skilled in the art that such separate sources may be employed with my invention without departing therefrom.

In the light of the foregoing description, it becomes evident that the switching system of my invention provides for the selective transmission of signals between any selected one of a plurality of pairs of terminals and a pair of common terminals by the application of a direct biasing voltage of predetermined polarity to a biasing circuit associated with the selected pair of terminals, the remaining ones of the plurality of pairs of terminals being effectively disconnected from the common pair of terminals by the negative biasing action of the applied direct voltage. It will also be apparent that the orientation of all of the unidirectional impedances 16 and 17 may equally well be opposite to that shown in the drawing, the polarity of the biasing source battery 18 being made correspondingly opposite to that shown. The present transmission system is very fast acting in switching from one selected pair of terminals to another, making possible the switching from one set of terminals 5—6 to another in the order of 100 microseconds in a constructed embodiment by using electronic circuits to provide the direct biasing voltages. Transient current flow caused by switching from one pair of terminals 5—6 to another, i. e., removing the biasing voltage for one pair of terminals 5—6 and applying a biasing voltage for another is minimized by the fact that the voltage across the shunt-connected resistor combinations due to biasing current may be adjusted to be zero, so that if the signal voltage is zero at the time of switching, as it most always is in practice, the circuits connected to the common terminals 1 and 2 and to the pairs of terminals 5—6 are generally deenergized and only very short duration and low amplitude transients result.

While the present invention has been described by reference to a particular embodiment thereof, it will be understood that modifications may be made by those skilled in the art without actually departing from the invention. I, therefore, aim in the appended claims to cover all such equivalent variations as come within the true spirit and scope of the foregoing disclosure.

What I claim as new and desire to secure by Letters Patent of the United States is:

1. A selective signal transmission system for selectively transmitting electrical signals between a first pair of terminals and any one of a plurality of second pairs of terminals, said system comprising a tapped resistor connected in shunt relation with said first pair of terminals, a plurality of center tapped resistors each connected in shunt relation with one of said second pairs of terminals, and a plurality of pairs of unidirectional impedances each similarly poled and connecting the extremities of each of said center tapped resistors and the extremities of said tapped resistor, whereby a direct voltage of predeterminal polarity applied between the tap of said tapped resistor and the center tap of any one of said center tapped resistors effectively connects only the corresponding second pair of terminals to said first pair of terminals for signal transmission therebetween.

2. A selective signal transmission system for selectively transmitting electrical signals between a first pair of terminals and any one of a plurality of second pairs of terminals, said system comprising a first center tapped resistor connected in shunt relation with said first pair of terminals, a plurality of other center tapped resistors each connected in shunt relation with one of said second pairs of terminals, and a pair of unidirectional impedances connected with like polarity between the extremities of each of said other center tapped resistors and the extremities of said first center tapped resistor, means for removably connecting the center tap of each of said other resistors to the center tap of said first resistor, and means for removably applying a direct voltage of predetermined polarity individually between the center tap of one of said other resistors and the center tap of said first resistor whereby the corresponding one second pair of terminals is effectively connected to said first pair of terminals for signal transmission therebetween.

3. A selective signal transmission system comprising a plurality of signal sources, a plurality of center tapped resistors each connected in parallel combination with one of said sources, an output circuit, a center tapped output resistor connected in parallel combination with said output circuit, a pair of similarly poled unidirectional impedances in series with each of said signal sources and said output circuit, a direct voltage source of predetermined polarity being connected between said output resistor center tap and the center tap of any one of said plurality of center tapped resistors for transmission of signals from the corresponding one source to said output circuit.

4. A selective signal transmission system for selectively transmitting electrical signals from a single signal source to any one of a plurality of load devices, said system comprising a first pair of serially-connected resistors connected in shunt relation with said signal source, a plurality of second pairs of serially-connected resistors each connected in shunt relation with one of said load devices, and a pair of unidirectional impedance devices connected with like polarity between the extremities of each of said second pairs of serially-connected resistors and the extremities of said first pair of serially-connected resistor, whereby a direct voltage of predetermined polarity applied between the junction of any selected one of said second pairs of resistors and the junction of said first pair of resistors effectively connects only the load device corresponding to said selected one second pair of resistors for receiving signals from said source.

5. A selective signal transmission system for selectively transmitting electrical signals between a first pair of terminals and any one of a plurality of second pairs of terminals in response to electrical actuation; said system comprising a first resistor, a potentiometer having an adjustable tap, and a second resistor in series combination in the order named connected in shunt relation with said first pair of terminals; a plurality of pairs of equal valued serially-connected resistors each connected in shunt relation with one of said second pairs of terminals; a pair of substantially identical unidirectional impedances each serially connected with like polarity between said first pair of terminals and one of said second pairs of terminals; whereby a direct voltage of predetermined polarity applied between said adjustable tap and the junction of a selected one of said pair of resistors biases the pair of unidirectional impedance devices associated with said selected pair of resistors to effectively connect the second pair of terminals associated with said selected pair of resistors to said common pair of terminals for signal transmission therebetween, and biases the remaining pairs of said unidirectional impedances to effectively disconnect the remaining second pairs of terminals from said first pair of terminals.

6. The combination of a transformer and a plurality of magnetic recording and reproducing heads with a selective signal transmission system for selectively transmitting electrical signals between any one of said heads and said transformer, said transformer having an electrical winding, said recording heads each having a signal coil, said transmission system comprising a first center tapped resistor connected in shunt relation with said first winding, a plurality of cener tapped resistors each connected in shunt relation with one of said signal coils, a pair of unidirectional impedances oriented with like polarity connecting the extremities of each of said second resistors with the extremiies of said first resistor, and means for individually applying a direct voltage of predetermined polarity between the center tap of any one of said second resistors and the center tap of said first resistor whereby the corresponding one signal coil is effectively connected to said electrical winding for signal transmission therebetween and the remaining signal coils are effectively disconnected from said electrical winding.

HERMAN JANKOWSKI.

REFERENCES CITED

The following references are of record in the file of this patent:

UNITED STATES PATENTS

| Number | Name | Date |
|---|---|---|
| 2,561,051 | Hertog | July 17, 1951 |
| 2,563,589 | Hertog | Aug. 7, 1951 |
| 2,583,711 | Scowen | Jan. 28, 1952 |